United States Patent
Hong

(10) Patent No.: US 7,334,053 B2
(45) Date of Patent: Feb. 19, 2008

(54) METHOD AND SYSTEM FOR DETECTING STATE OF DISC DRIVE

(75) Inventor: Sung-Min Hong, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 10/840,101

(22) Filed: May 6, 2004

(65) Prior Publication Data
US 2005/0052979 A1    Mar. 10, 2005

(30) Foreign Application Priority Data
May 6, 2003   (KR)   .................. 10-2003-0028599

(51) Int. Cl.
*G06F 13/10* (2006.01)
(52) U.S. Cl. .............. 710/15; 710/8; 710/16; 710/19
(58) Field of Classification Search ............ None
See application file for complete search history.

(56) References Cited

U.S. PATENT DOCUMENTS

| | | | |
|---|---|---|---|
| 5,519,882 A * | 5/1996 | Asano et al. .......... 710/10 |
| 6,145,019 A * | 11/2000 | Firooz et al. .......... 710/8 |
| 6,349,345 B1 * | 2/2002 | Sims et al. .......... 710/8 |
| 6,647,436 B1 * | 11/2003 | Jedrzejewski et al. ...... 710/14 |
| 6,735,671 B1 * | 5/2004 | Kida .......... 711/111 |
| 6,779,068 B2 * | 8/2004 | Kim .......... 710/303 |
| 6,874,060 B2 * | 3/2005 | Blood et al. .......... 711/111 |

OTHER PUBLICATIONS

Korean Patent Application No. 20-2001-0000287 to Han, having Application date of Jan. 5, 2001 (w/ English Abstract page).
Korean Patent Application No. 10-1997-0080574 to Lee, having Publication date of Jul. 26, 1999 (w/ English Abstract page).
Korean Patent Application No. 10-2000-0074450 to Han, having Publication date of Mar. 5, 2001 (w/ English Abstract page).
Japanese Patent Publication No. 2001-022527 to Kida Minoru, having Publication date of Jan. 26, 2001 (w/ English Abstract page).

* cited by examiner

*Primary Examiner*—Ilwoo Park
(74) *Attorney, Agent, or Firm*—Monica H. Choi

(57) ABSTRACT

A method and system for detecting a state of a disc drive. A cable select signal is input from a host and is gated to determine the state of the disc drive when a jumper is set to indicate that the disc drive is in a cable select state or when the jumper is missing. The cable select signal is prevented from determining the state of the disc drive when the jumper is present and is set to indicate that the disc drive is in the master state or the slave state. Additionally, the cable select signal dictates the state of the disc drive when the jumper is present and is set to indicate that the disc drive is in the cable select state.

18 Claims, 4 Drawing Sheets

METHOD AND SYSTEM FOR DETECTING STATE OF DISC DRIVE

BACKGROUND OF THE INVENTION

This application claims priority to Korean Patent Application No. 2003-28599, filed on May 6, 2003, in the Korean Intellectual Property Office, the disclosure of which is incorporated herein in its entirety by reference.

1. Field of the Invention

The present invention relates to a method and system for a disc drive, and more particularly, to a method and system for detecting a state of the disc drive, that is master (MA) or slave (SL), even without a jumper.

2. Description of the Related Art

A disc drive 100, such as a CD-ROM drive, a DVD-ROM drive, or a hard disc drive, includes setting pins 102 indicating a master (MA), a slave (SL), or a cable select (CSEL) state. FIG. 1 is a back view of a disc drive showing a connector pin of the disc drive.

As shown in FIG. 1, the disc drive 100 generally includes an audio output terminal 101, MA/SL/CSEL setting pins 102, an interface terminal 103, and a power source input terminal 104.

The audio output terminal 101 is connected to an audio signal input terminal of a sound card, and the MA/SL/CSEL setting pins 102 are used for setting the disc drive 100 in one of the MA, the SL, or the CSEL state. The interface terminal 103 is typically formed of 40 pins and is used for transmitting control signals and data between the disc drive 100 and a host (not shown). Although it is not shown, a pin 28 of the interface terminal 103 is internally connected to a pin 46 of the MA/SL/CSEL setting pins 102. The power source input terminal 104 is formed of two grounding pins, a 5V power supply pin, and a 12V power supply pin.

FIG. 2 is a magnified drawing of a setting pin to set a disc drive in one of a master (MA), a slave (SL), and a cable select (CSEL) state, and FIG. 3 is a detection circuit diagram of a disc drive according to prior art.

As shown in FIG. 2, in a case where a jumper 102-1 is linked to MA pins 41 and 42 among the MA/SL/CSEL setting pins 102 in instance (a) of FIGS. 2 and 3, the pins 41 and 42 in FIG. 3 are in a low (or grounded) state. In this case, a low signal is output to a micom (not shown) in a host, and the disc drive 100 is detected as a MA drive.

In addition, in a case where the jumper 102-1 is linked to SL pins 43 and 44 among the MA/SL/CSEL setting pins 102 in instance (b) of FIGS. 2 and 3, the SL pins 43 and 44 in FIG. 3 are in a high state (+Vcc). In this case, a high signal is output to the micom (not shown) in the host, and the disc drive 100 is detected as a SL drive.

Furthermore, in a case where the jumper 102-1 is linked to CSEL pins 45 and 46 among the MA/SL/CSEL setting pins 102 in instance (c) of FIGS. 2 and 3, the CSEL pins 45 and 46 in FIG. 3 are in one of the high and low states according to a CSEL signal input from a pin 28 of the interface terminal 103. In this case, one of high and low signals is output to the micom (not shown) in the host, and the disc drive 100 is detected as one of the MA and SL drive.

In communications between the disc drive 100 and the host, the state of the disc drive 100, whether it is in the MA or SL state, is decided according to the place where the jumper 102-1 is linked. However, if the jumper 102-1 is improperly linked due to a user's mistake or the jumper is lost, it is impossible or almost impossible to detect the state of the disc drive 100. Namely, the jumper 102-1 is an essential element in this situation.

In FIG. 3, resistance R32 is added so that the disc drive 100 may be detected without the jumper 102-1. However, if the resistance R32 is shorted, an error occurs when detecting the state of the disc drive 100, especially when detecting the state of two disc drives. That is, when two disc drives are linked to the CSEL pin, one of the MA and SL drive can be detected; however when the two disc drives are not linked via the jumper, an error occurs when checking the state of the disc drives.

An example application for the above method of detecting the disc drive is disclosed in U.S. Pat. No. 5,796,684.

Thus, a mechanism is desired for reliably detecting the state of the disc drive even when the jumper is not present because a user fails to set the jumper or when the jumper is missing.

SUMMARY OF THE INVENTION

The present invention provides such a reliable method and system for detecting a disc drive, whether it is in a master (MA) or slave (SL) state, when a jumper is open due to a user's mistake or because the jumper is missing.

In a method and system for detecting a state of a disc drive, a cable select signal is input from a host. The cable select signal is gated to determine the state of the disc drive when a jumper is set to indicate that the disc drive is in a cable select state or when the jumper is missing.

The jumper that is not missing is set to indicate whether the disc drive is in a master state, a slave state, or the cable select state. In an example embodiment of the present invention, at least one buffer within a cable select detection circuit is turned on to couple the cable select signal to a logic mismatching gate having an output that indicates the state of the disc drive.

In a further embodiment of the present invention, the cable select signal is prevented from determining the state of the disc drive when the jumper is set to indicate that the disc drive is in the master state or the slave state. In an example embodiment of that case, at least one buffer is turned off for uncoupling the cable select signal from an output that indicates the state of the disc drive.

In yet another embodiment of the present invention, a first logic level is output for indicating that the disc drive is in the master state when the jumper is set to indicate that the disc drive is in the master state. Further in that case, a second logic level is output for indicating that the disc drive is in the slave state when the jumper is set to indicate that the disc drive is in the slave state.

In an example embodiment of the present invention, a first buffer within a master detection circuit is turned on to output the first logic level when the jumper is set to indicate that the disc drive is in the master state. Also in that embodiment, a second buffer within a slave detection circuit is turned on for causing the logic mismatching gate to output the second logic level when the jumper is set to indicate that the disc drive is in the slave state.

In this manner, gates such as buffers and logic gates are used for reliably detecting the state of the disc drive from the cable select signal even when the jumper is open due to user error or because the jumper is missing. On the other hand, the jumper that is present dictates the state of disc drive when the jumper is set to indicate that the disc drive is in the master state or the slave state. Furthermore, the cable select signal is used to dictate the state of the disc drive when the jumper is present and is set to indicate that the disc drive is in the cable select state.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the attached drawings, in which exemplary embodiments of the invention are shown.

Figure 4:
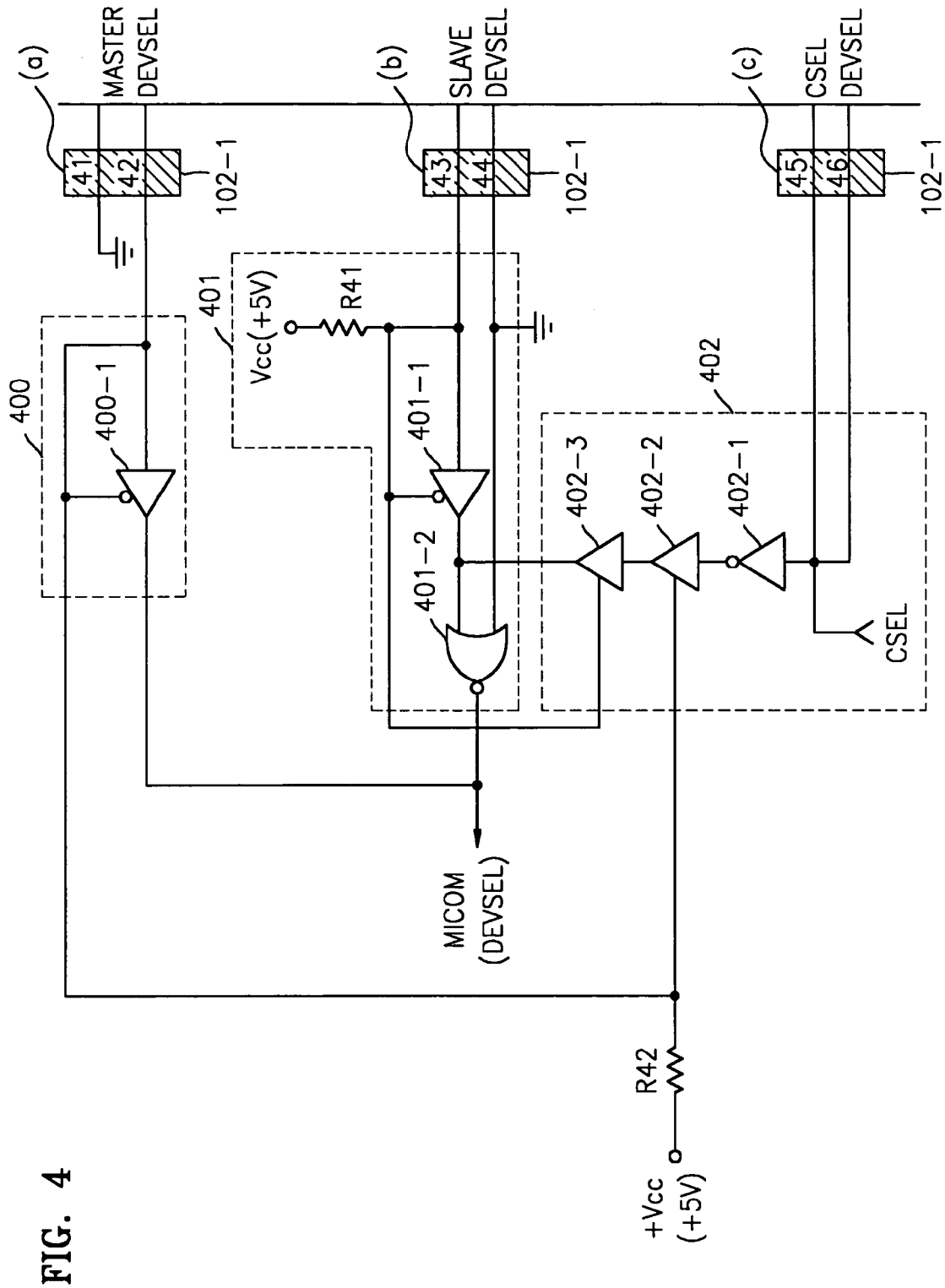
FIG. 4 is a detection circuit diagram of a disc drive according to an embodiment of the present invention.

FIG. 4 shows components of a disc drive detection circuit according to an embodiment of the present invention. The disc drive detection circuit of FIG. 4 may form part of a disc drive or may be placed apart from the disc drive, for detecting the state of the disc drive. Referring to FIG. 4, the disc drive detection circuit comprises a master (MA) detection circuit 400 including a first buffer 400-1 and a slave (SL) detection circuit 401 including a second buffer 401-1 and a logic mismatching gate 401-2. The disc drive detection circuit of FIG. 4 also comprises a cable select (CSEL) detection circuit 402 including an inverter 402-1, a third buffer 402-2, and a fourth buffer 402-3.

Figure 1:
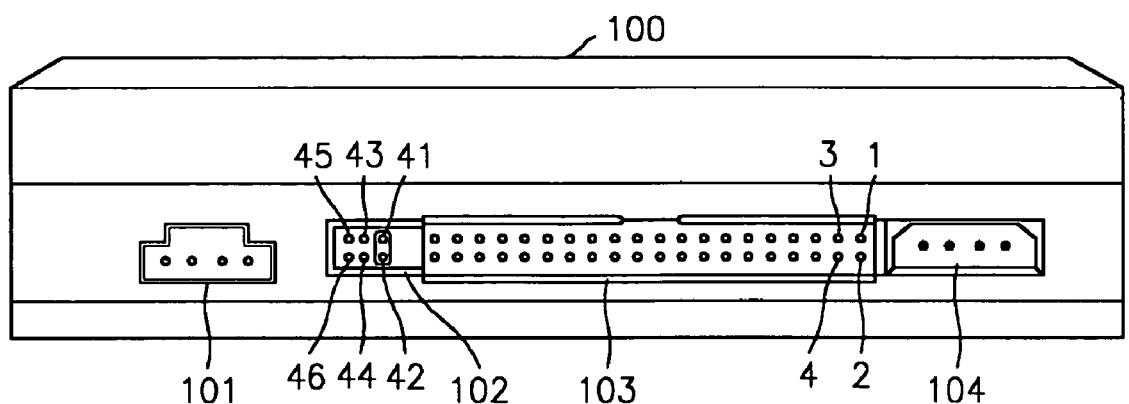
FIG. 1 is a back view of a disc drive showing a connector pin of the disc drive.

The operation of the disc drive detection circuit will be explained in detail with reference to FIGS. 1, 2, and 4. In addition, the disc drive detection circuit of FIG. 4 operates generally according to the flow-chart of the steps of FIG. 5, according to one example embodiment of the present invention.

Generally, when the output node (i.e., the node near the MICOM label in FIG. 4) of the disc drive detection circuit of FIG. 4 outputs a low state, a micom (not shown) in a host detects the disc drive 100 as a master (MA) drive. Alternatively, when the output node of the disc drive detection circuit of FIG. 4 outputs a high state, the micom in the host detects the disc drive 100 as a slave (SL) drive.

Figure 2:
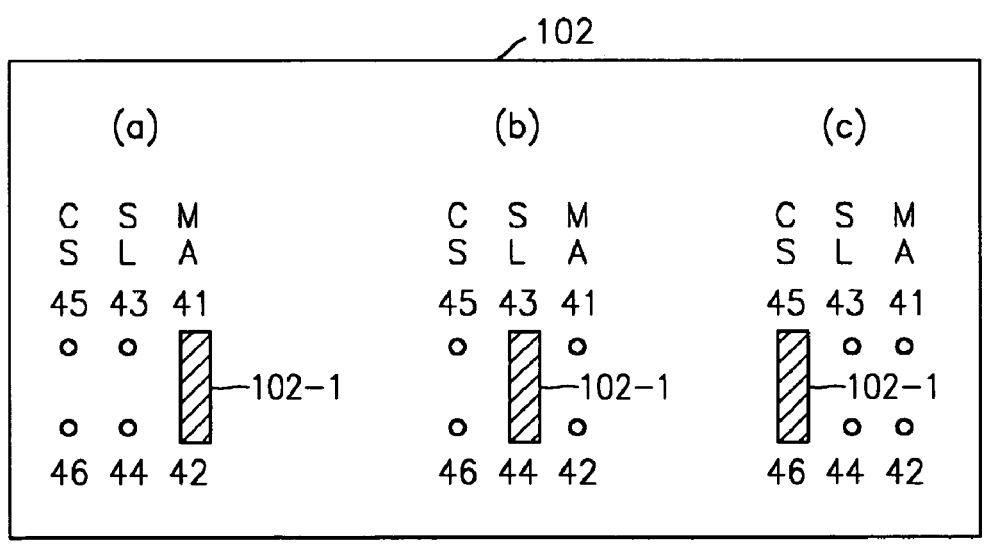
FIG. 2 is a magnified drawing of a setting pin to set a disc drive in a master (MA), a slave (SL), or a cable select (CSEL) state.
Figure 3:
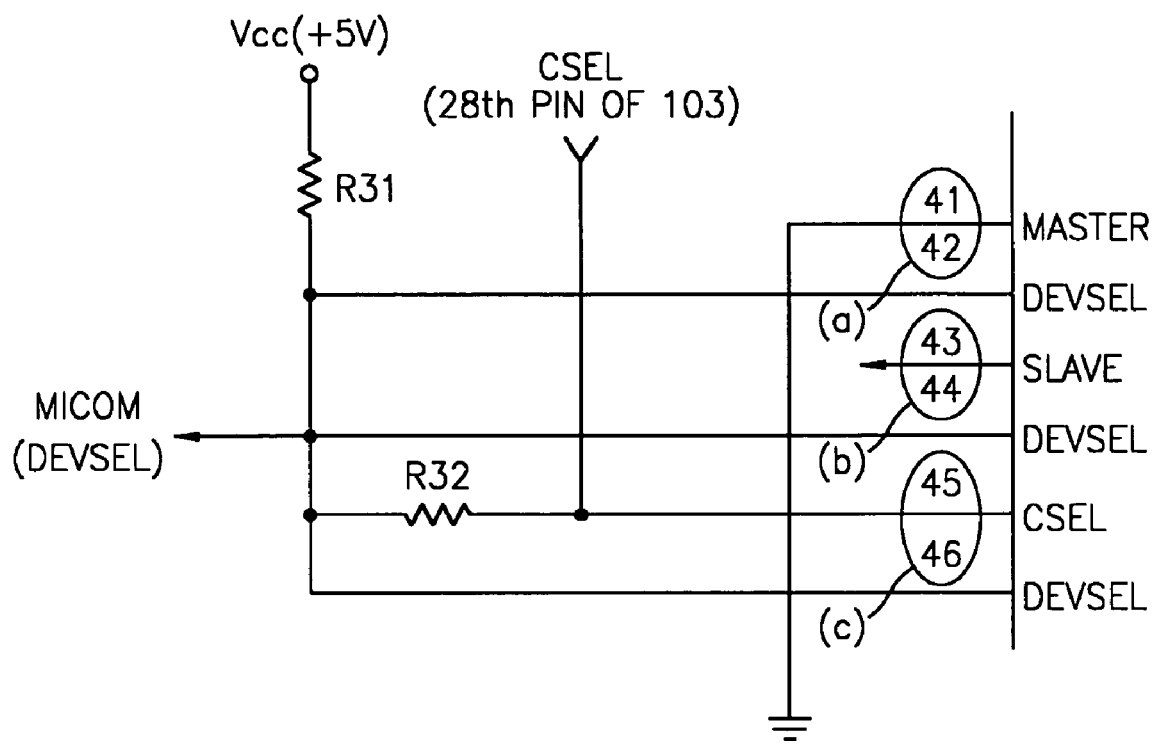
FIG. 3 is a detection circuit diagram of a disc drive according to prior art.

First, consider the case when the jumper 102-1 is linked to MA pins 41 and 42 (step 500 of FIG. 5), which make up a first input terminal, among MA/SL/CSEL setting pins 102 in instance (a) of FIG. 2. In that case, the jumper 102-1 is set to indicate that the disc drive is in the master state. Also in that case, the MA pins 41 and 42 are in the low (or grounded) state in FIG. 4, and power from a voltage supply Vcc is completely consumed in resistance R42.

Also in that case with the MA pins 41 and 42 grounded, the first buffer 400-1 is turned on to output a jumper signal that is the low state to the micom (not shown) in the host. The micom also generates the cable select signal CSEL that is input by the cable select detection circuit 402 at the input node labeled CSEL in FIG. 4. However, because the control signal reaching the third buffer 402-2 is in the low state, the third buffer 402-2 is turned off. With the third buffer 402-2 being turned off, the cable select signal CSEL is uncoupled from the mismatching gate 401-2 and thus from the output of the disc drive detection circuit of FIG. 4. Note that the output of the disc drive detection circuit of FIG. 4 is the node coupling the outputs of the mismatching gate 401-2 and the first buffer 400-1.

Figure 5:
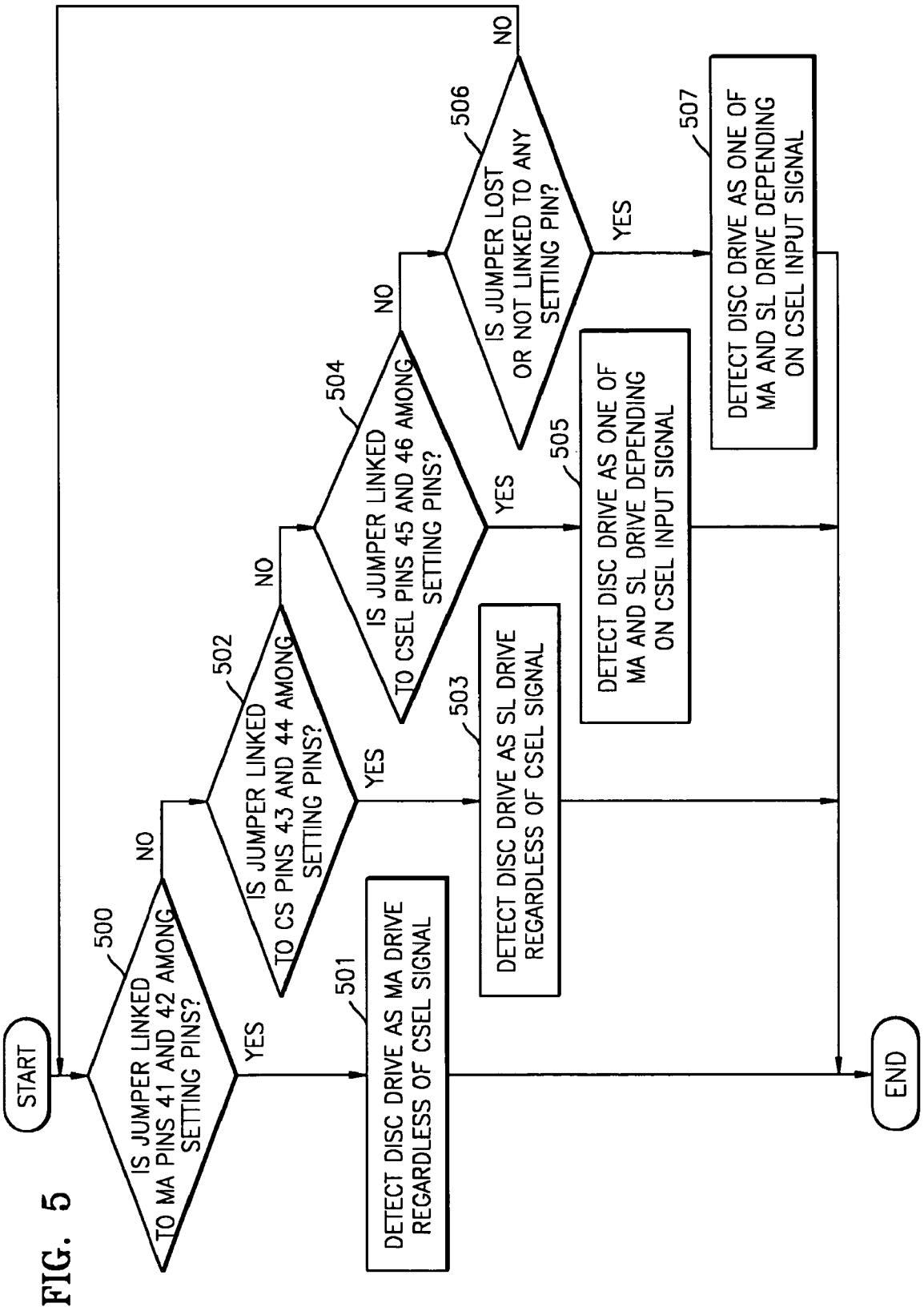
FIG. 5 is a flow chart illustrating a method of detecting a disc drive according to an embodiment of the present invention.

Accordingly, the cable select signal CSEL has no affect on the output of the disc drive detection circuit of FIG. 4 (step 501 of FIG. 5). Furthermore, the micom detects the disc drive 100 as the MA drive (step 501 of FIG. 5) since the output of the disc drive detection circuit of FIG. 4 is maintained to be at a first logic level (i.e., the low state) when the jumper 102-1 links the MA pins 41 and 42 to the low state.

Second, consider the case when the jumper 102-1 is linked to SL pins 43 and 44 (step 502 of FIG. 5), which make up a second input terminal, among the MA/SL/CSEL setting pins 102 in instance (b) of FIG. 2. In that case, the SL pins 43 and 44 are in the low (or grounded) state, and power from the voltage source Vcc is completely consumed in resistance R41.

Also in that case, the second buffer 401-1 is turned on to output the jumper signal that is at the low state to the logic mismatching gate 402-1. The logic mismatching gate 401-2 which is a NOR gate inputs the low signal output from the second buffer 401-1 and the low signal of the SL pin 44 and outputs the high signal to the micom.

The micom also generates the cable select signal CSEL that is input by the cable select detection circuit 402 at the input node labeled CSEL in FIG. 4. However, because the control signal reaching the fourth buffer 402-3 is low, the fourth buffer 402-3 is turned off. With the fourth buffer 402-3 being turned off, the cable select signal CSEL is uncoupled from the mismatching gate 401-2 and thus from the output of the disc drive detection circuit of FIG. 4.

Accordingly, the cable select signal CSEL has no affect on the output of the disc drive detection circuit of FIG. 4 (step 503 of FIG. 5). Furthermore, the micom detects the disc drive 100 as the SL drive (step 503 of FIG. 5) since the output of the disc drive detection circuit of FIG. 4 is maintained to be at a second logic level (i.e., the high state) when the jumper 102-1 links the SL pins 43 and 44 to the low state.

Third, consider the case when the jumper 102-1 is linked to CSEL pins 45 and 46 (step 504 of FIG. 5), which make up a third input terminal, among the MA/SL/CSEL setting pins 102 in instance (c) of FIG. 2. In that case, the CS pins 45 and 46 are in one of the low and high states, depending on the CSEL signal transmitted from the micom.

If the CSEL signal transmitted from the micom is in the low state, the inverter 402-1 inverts the low signal and outputs it as the high signal. Since the jumper 102-1 is linked to CSEL pins 45 and 46, the control signals to the third and fourth buffers 402-2 and 402-3 are each in the high state such that the third and fourth buffers 402-2 and 402-3 are turned on.

Accordingly, the high signal as an output signal of the inverter 402-1 is coupled to the logic mismatching gate 401-2 via the third buffer 402-2 and the fourth buffer 402-3 that are turned on. The logic mismatching gate 401-2 which is a NOR gate inputs the high signal as output by the fourth buffer 402-3 and the low (or grounded) signal of the SL pin 44 to output the low signal. Therefore, when the CSEL signal transmitted from the micom is the low signal, the disc drive 100 is detected as the MA drive (step 505 of FIG. 5).

Alternatively, when the CSEL signal transmitted from the micom is in the high state, the inverter 402-1 inverts the high signal and outputs it as the low signal. Since the jumper 102-1 is linked to CSEL pins 45 and 46, the control signals to the third and fourth buffers 402-2 and 402-3 are each in the high state such that the third and fourth buffers 402-2 and 402-3 are turned on.

Accordingly, the low signal as the output signal of the inverter 402-1 is input to the logic mismatching gate 401-2 via the third buffer 402-2 and the fourth buffer 402-3 that are turned on. The logic mismatching gate 401-2 which is a NOR gate inputs the low signal as output by the fourth buffer 402-3 and the low (or grounded) signal of the SL pin 44 and outputs the high signal. Therefore, when the CSEL signal transmitted from the micom is the high signal, the disc drive 100 is detected as the SL drive (step 505 of FIG. 5).

Next, consider the case of the jumper 102-1 being lost or the jumper 102-1 being not linked to any setting pin among the MA/SL/CSECL setting pins 102 (step 506 of FIG. 5). In that case, the CSEL detection circuit 402 operates. The pin 28 of the interface terminal 103 is linked to the CS pin 46 among the MA/SL/CSEL setting pins 102, and thus, the CSEL signal is still input by the CSEL detection circuit 402 without the linkage of the jumper 102-1.

If the CSEL signal transmitted from the micom is in the low state, the inverter 402-1 inverts the low signal and outputs it as the high signal. Even when the jumper 102-1 is not linked to any of the pins 41, 42, 43, 44, 45 and 46 in FIG. 4, the control signals to the third and fourth buffers 402-2 and 402-3 are each in the high state such that the third and fourth buffers 402-2 and 402-3 are turned on.

Accordingly, the high signal as the output signal of the inverter 402-1 is input to the logic mismatching gate 401-2 via the third buffer 402-2 and the fourth buffer 402-3 that are turned on. The logic mismatching gate 401-2 which is a NOR gate inputs the high signal as output by the fourth buffer 402-3 and the low (or grounded) signal of the SL pin 44 and outputs the low signal. Therefore, when the CSEL signal transmitted from the micom is the low signal, the disc drive 100 is detected as the MA drive even when the jumper 102-1 is not linked to any of the pins 41, 42, 43, 44, 45 and 46 (step 507 of FIG. 5).

Alternatively, if the CSEL signal transmitted from the micom is in the high state, the inverter 402-1 inverts the high signal and outputs it as the low signal. Even when the jumper 102-1 is not linked to any of the pins 41, 42, 43, 44, 45 and 46 in FIG. 4, the control signals to the third and fourth buffers 402-2 and 402-3 are each in the high state such that the third and fourth buffers 402-2 and 402-3 are turned on. Therefore, the low signal as the output signal of the inverter 402-1 is input to the logic mismatching gate 401-2 via the third buffer 402-2 and the fourth buffer 402-3 that are turned on.

The logic mismatching gate 401-2 which is a NOR gate inputs the low signal as output by the fourth buffer 402-3 and the low (or grounded) signal of the SL pin 44 and outputs the high signal. Therefore, when the CSEL signal transmitted from the micom is the high signal, the disc drive 100 is detected as the SL drive even when the jumper 102-1 is not linked to any of the pins 41, 42, 43, 44, 45 and 46 (step 507 of FIG. 5).

In this manner, gates such as buffers 400-1, 401-1, 402-2, and 402-3 and logic gates 401-2 and 402-1 are used within the disc drive detection circuit of FIG. 4 for reliably detecting the state of the disc drive. Such a disc drive detection circuit detects for the state of the disc drive from the cable select signal CSEL even when the jumper 102-1 is open due to user error or because the jumper is missing. On the other hand, the jumper 102-1 that is present dictates the state of the disc drive when the jumper 102-1 is set to indicate that the disc drive is in the master state or the slave state. Furthermore, the cable select signal CSEL is used to dictate the state of the disc drive when the jumper 102-1 is present and is set to indicate that the disc drive is in the cable select state.

The foregoing is by way of example only and is not intended to be limiting. For example, the disc drive detection circuit of FIG. 4 may be implemented with other types of gating elements than the buffers and logic gates used in the example embodiment of FIG. 4. The buffers 400-1, 401-1, 402-2, and 402-3 may be generalized to any type of controlled gating elements, such as switches for an alternative example. Thus, it should be understood by those of ordinary skill in the art that various changes in form and details may be made without departing from the spirit and scope of the present invention as defined by the following claims.

What is claimed is:

1. A method for detecting a state of a disc drive, comprising:
    inputting a cable select signal;
    setting a jumper across one of a first set of pins for indicating that the disc drive is in a master state, a second set of pins for indicating that the disc drive is in a slave state, or a third set of pins for indicating that the disc drive is in a cable select state; and
    using at least one voltage from at least one of the first and second sets of pins for controlling at least one gate to couple the cable select signal to an output for indicating the state of the disc drive when the jumper is not set across any of the first, second, and third sets of pins.

2. The method of claim 1, wherein the at least one gate includes a first buffer controlled by a first voltage at one of the first set of pins, and includes a second buffer controlled by a second voltage at one of the second set of pins, with the first and second buffers coupled in series between the output and a pin that has the cable select signal applied thereon.

3. The method of claim 2, further comprising:
    turning off at least one of the first and second buffers for uncoupling the cable select signal from the output when the jumper is set across any of the first and second sets of pins.

4. The method of claim 2, further comprising:
    turning on the first and second buffers using voltages from the first and second sets of pins as control signals to the first and second buffers when the jumper is set across the third set of pins.

5. The method of claim 1, further comprising:
    using at least one voltage from at least one of the first and second sets of pins for controlling said at least one gate to uncouple the cable select signal from the output when the jumper is set across any of the first and second sets of pins.

6. The method of claim 1, further comprising:
    outputting a first logic level for indicating that the disc drive is in the master state when the jumper is set across the first set of pins; and
    outputting a second logic level for indicating that the disc drive is in the slave state when the jumper is set across the second set of pins.

7. The method of claim 6, further comprising:
    turning on a first buffer comprising the at least one gate that outputs the first logic level when the jumper is set across the first set of pins; and
    turning on a second buffer comprising the at least one gate for causing a logic mismatching gate to output the second logic level when the jumper is set across the second set of pins.

8. The method of claim 1, further comprising:
using the at least one voltage from the at least one of the first and second sets of pins for controlling the at least one gate to couple the cable select signal to the output for indicating the state of the disc drive when the jumper is set across the third set of pins.

9. A method for detecting a state of a disc drive, comprising:
inputting a cable select signal;
gating the cable select signal to determine the state of the disc drive when a jumper is set to indicate that the disc drive is in a cable select state or when the jumper is missing, the step of gating including the step of:
turning on at least one buffer that couples the cable select signal to a logic mismatching gate having an output that indicates the state of the disc drive.

10. A system for detecting a state of a disc drive, comprising:
an input node for inputting a cable select signal;
a first set of pins, a second set of pins, and a third set of pins, wherein a jumper is set across one of the first set of pins for indicating that the disc drive is in a master state, the second set of pins for indicating that the disc drive is in a slave state, or the third set of pins for indicating that the disc drive is in a cable select state; and
at least one gate that is controlled by at least one voltage from at least one of the first and second sets of pins for coupling the cable select signal to an output for indicating the state of the disc drive when the jumper is not set across any of the first, second, and third sets of pins.

11. The system of claim 10, wherein the at least one gate includes a first buffer controlled by a first voltage at one of the first set of pins, and includes a second buffer controlled by a second voltage at one of the second set of pins, with the first and second buffers coupled in series between the output and a pin that has the cable select signal applied thereon.

12. The system of claim 11, wherein at least one of the first and second buffers is turned off for uncoupling the cable select signal from the output when the jumper is set across any of the first and second sets of pins.

13. The system of claim 11, wherein the first and second buffers are controlled to be turned on using voltages from the first and second sets of pins as control signals to the first and second buffers when the jumper is set across the third set of pins.

14. The system of claim 10, wherein at least one voltage from at least one of the first and second sets of pins controls said at least one gate to uncouple the cable select signal from the output when the jumper is set across any of the first and second sets of pins.

15. The system of claim 10, further comprising:
a master detection circuit that outputs a first logic level for indicating that the disc drive is in the master state when the jumper is set across the first set of pins; and
a slave detection circuit that outputs a second logic level for indicating that the disc drive is in the slave state when the jumper is set across the second set of pins.

16. The system of claim 15, further comprising:
a first buffer that is turned on within the master detection circuit for outputting the first logic level when the jumper is set across the first set of pins; and
a second buffer that is turned on within the slave detection circuit for causing a logic mismatching gate to output the second logic level when the jumper is set across the second set of pins.

17. The system of claim 10, wherein the at least one gate is controlled by the at least one voltage from the at least one of the first and second sets of pins to couple the cable select signal to the output for indicating the state of the disc drive when the jumper is set across the third set of pins.

18. A system for detecting a state of a disc drive, comprising:
an input node for inputting a cable select signal;
at least one gate for gating the cable select signal to determine the state of the disc drive when a jumper is set to indicate that the disc drive is in a cable select state or when the jumper is missing; and
a cable select detection circuit having at least one buffer that is turned on to couple the cable select signal to a logic mismatching gate having an output that indicates the state of the disc drive, when the jumper is set to indicate that the disc drive is in the cable select state or when the jumper is missing.

* * * * *